(12) United States Patent
Bevins, Jr. et al.

(10) Patent No.: US 9,849,578 B2
(45) Date of Patent: Dec. 26, 2017

(54) CONDUCTIVE BOOT FOR POWER TOOL PROTECTION

(71) Applicant: M. W. Bevins, Co., Tulsa, OK (US)

(72) Inventors: Richard C. Bevins, Jr., Tulsa, OK (US); Denver K. Kimberlin, Coweta, OK (US); Martin C. Admire, Tulsa, OK (US)

(73) Assignee: M. W. Bevins, Co., Tulsa, OK (US)

( * ) Notice: Subject to any disclaimer, the term of this patent is extended or adjusted under 35 U.S.C. 154(b) by 0 days.

(21) Appl. No.: 15/212,632

(22) Filed: Jul. 18, 2016

(65) Prior Publication Data

US 2016/0325424 A1    Nov. 10, 2016

Related U.S. Application Data

(62) Division of application No. 14/702,475, filed on May 1, 2015, now Pat. No. 9,393,683.

(Continued)

(51) Int. Cl.
*B25F 5/02* (2006.01)
*B23D 59/00* (2006.01)
*B25F 5/00* (2006.01)

(52) U.S. Cl.
CPC ............... *B25F 5/02* (2013.01); *B23D 59/00* (2013.01); *B23D 59/001* (2013.01); *B25F 5/00* (2013.01); *Y10T 408/65* (2015.01)

(58) Field of Classification Search
CPC ......... B25F 5/00; Y10T 408/65; B23D 59/00; H01M 2/1022; H01M 2220/30
USPC ......... 83/701; 173/46, 171, 20, 2; 29/592.1, 29/401.1; 30/272.1; 429/90, 96, 61, 99, 429/100, 7, 82, 93; 362/129, 183, 559, 362/326, 119; 439/500, 825, 527, 929, 439/699.1
See application file for complete search history.

(56) References Cited

U.S. PATENT DOCUMENTS 3,438,896 A   4/1969 Council et al.
3,633,191 A   1/1972 Engelhardt et al.
(Continued)

FOREIGN PATENT DOCUMENTS

DE   102005029402 A1 *  1/2007  ............. Y02B 40/83
EP        0314850 A1      5/1989
(Continued)

*Primary Examiner* — Ghassem Alie
(74) *Attorney, Agent, or Firm* — Hall Estill Attorneys at Law

(57) ABSTRACT

Apparatus for high voltage power line maintenance and repair. In some embodiments, a power tool has a housing which encloses an electrical load and a control electronics circuit using a first shield as a layer of conductive material which is open at a battery pack receiving slot of the housing configured to receive a removable battery pack. A removable boot surrounds the removeable battery pack and has a second shield as a layer of conductive material which combines with the first shield to form a combined shield that nominally encloses the power tool and the boot. An insulative hot stick supports the power tool at a distal end and a user interface at a proximal end. The user interface includes a communication circuit that communicates with the control electronics circuit via a non-conductive communication link that extends along the hot stick to selectively activate the electrical load.

20 Claims, 11 Drawing Sheets

Related U.S. Application Data

(60) Provisional application No. 61/987,750, filed on May 2, 2014.

(56) References Cited

U.S. PATENT DOCUMENTS

| | | | |
|---|---|---|---|
| 4,117,678 A | | 10/1978 | Turner et al. |
| 4,158,810 A | | 6/1979 | Leskovar |
| 4,261,818 A | | 4/1981 | Sweeney |
| 4,700,903 A | * | 10/1987 | Henn .................... A47J 43/046 |
| | | | 241/101.2 |
| 4,894,988 A | | 1/1990 | Hoppenjans |
| 5,299,464 A | | 4/1994 | Bennett |
| 5,598,082 A | * | 1/1997 | Gilpin ................. G06K 7/10881 |
| | | | 200/293.1 |
| 5,656,876 A | | 8/1997 | Radley et al. |
| 6,075,341 A | | 6/2000 | White et al. |
| 7,609,512 B2 | | 10/2009 | Richardson et al. |
| 7,969,730 B1 | | 6/2011 | Doherty et al. |
| 2007/0234579 A1 | | 10/2007 | Patrick |
| 2008/0043459 A1 | * | 2/2008 | Canino ................... B25B 21/00 |
| | | | 362/119 |
| 2013/0033233 A1 | * | 2/2013 | Noda ..................... H01M 10/44 |
| | | | 320/134 |
| 2014/0329119 A1 | * | 11/2014 | Tirone ................. H01M 2/1022 |
| | | | 429/90 |
| 2015/0075831 A1 | * | 3/2015 | Hanawa .............. H01M 2/1055 |
| | | | 173/217 |
| 2015/0202798 A1 | * | 7/2015 | Huang ................... B25F 5/001 |
| | | | 30/277.4 |

FOREIGN PATENT DOCUMENTS

| | | |
|---|---|---|
| EP | 0780943 A1 | 6/1997 |
| WO | 2013/077464 A1 | 5/2013 |

* cited by examiner

LINES OF CONSTANT E-FIELD MAGNITUDE
ADJACENT HIGH VOLTAGE CONDUCTOR

ELECTROSTATICALLY INDUCED VOLTAGE
ON UNGROUNDED DEVICE

CONDUCTIVE BOOT FOR POWER TOOL PROTECTION

RELATED APPLICATIONS

This application is a divisional of U.S. patent application Ser. No. 14/702,475 filed on Aug. 1, 2015 (and issued as U.S. Pat. No. 9,393,683 on Jul. 19, 2016) which makes a claim of domestic priority under 35 U.S.C. 119(e) to U.S. Provisional Patent Application No. 61/987,750 filed May 2, 2014, the contents of which are incorporated by reference.

SUMMARY

Various embodiments of the present disclosure are generally directed to the area of high voltage power line maintenance and repair, and more particularly to an improved powered tool arrangement which facilitates power driven maintenance and repair operations adjacent a high voltage power line.

In some embodiments, a power tool assembly includes a power tool having a housing which encloses at least an electrical load and a control electronics circuit to activate the electrical load. The housing has a first shield as a layer of conductive material that nominally encloses the electrical load and the control electronics circuit. The first shield is open at a battery pack receiving slot of the housing. A removable battery pack is mateable with the battery pack receiving slot of the housing to supply electrical power for use by the electrical load and the control electronics circuit. A removable boot is adapted to surround the removeable battery pack upon engagement with the housing. The boot has a second shield as a layer of conductive material which, which installed onto the boot, combines with the first shield to form a combined shield that nominally encloses the power tool and the boot. An insulative hot stick having opposing proximal and distal ends supports the power tool at the distal end of the hot stick. A user interface is supported by the proximal end of the hot stick and includes a communication circuit that communicates with the control electronics circuit via a communication link to selectively activate the electrical load. The communication link includes at least one non-conductive fiber optic cable that extends along a length of the hot stick between the proximal and distal ends.

In other embodiments, a power tool assembly adapted for use adjacent a high voltage power line includes an insulative hot stick comprising opposing proximal and distal ends. A power tool is supported by the distal end of the hot stick and includes a housing which encloses at least an electrical load and a control electronics circuit to activate the electrical load. The housing has a first shield as a layer of conductive material that nominally encloses the electrical load and the control electronics circuit. The first shield is open at a battery pack receiving slot of the housing. A removeable battery pack is mateable with the battery pack receiving slot of the housing to supply electrical power for use by the electrical load and the control electronics circuit. A removable protective boot is adapted to surround the removable battery pack upon engagement with the housing. The boot has a second shield as a layer of conductive material which, which installed onto the boot, combines with the first shield to form a combined shield that nominally encloses the power tool and the boot. A user interface is supported by the proximal end of the hot stick and is configured to enable a user to activate the power tool assembly via a non-conductive communication link that extends along an overall length of the hot stick. The communication link establishes communication between a user interface communication circuit of the user interface and the control electronics circuit.

These and other features which may characterize various embodiments can be understood in view of the following detailed discussion and the accompanying drawings.

DETAILED DESCRIPTION

Figure 1:
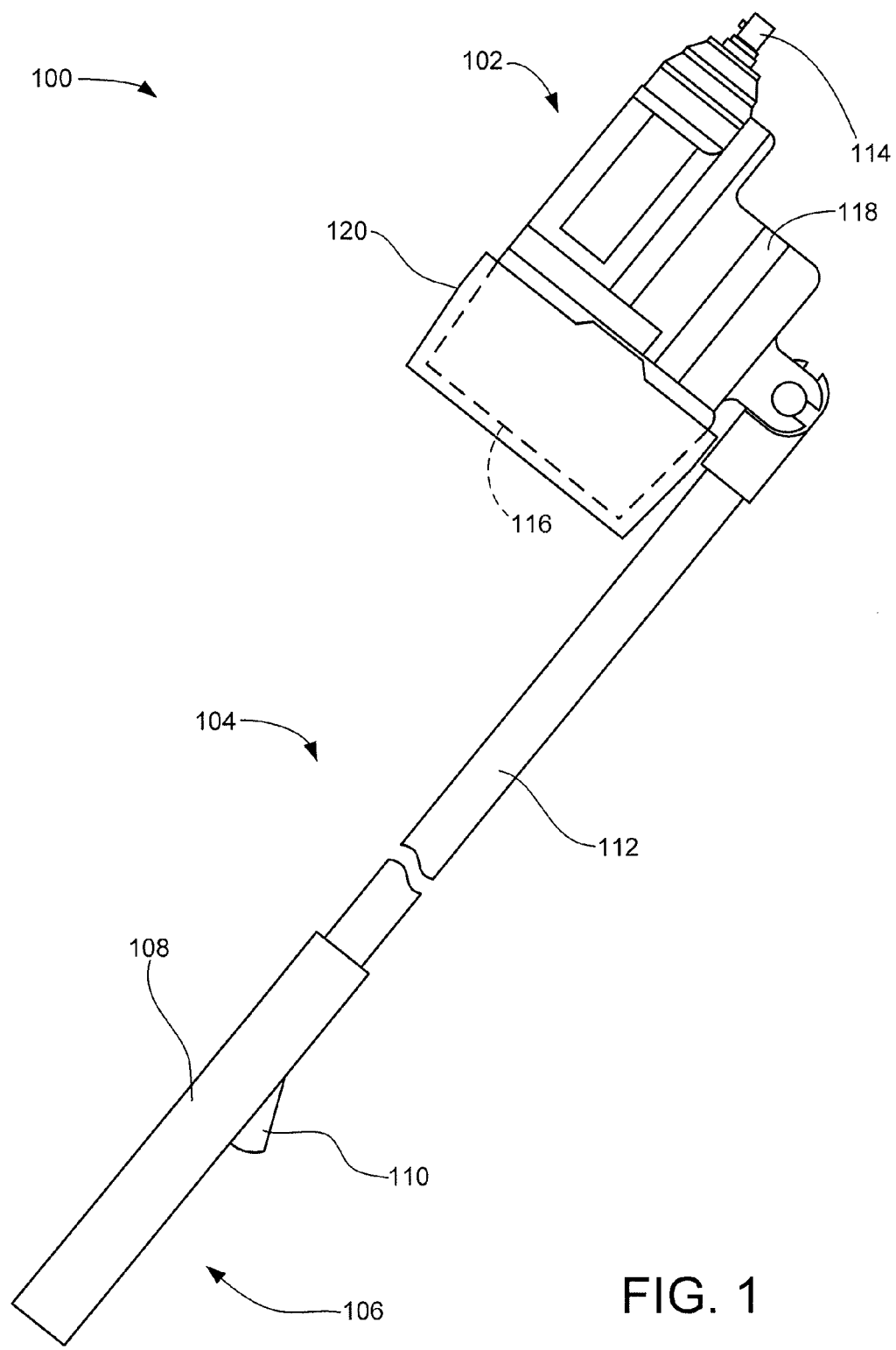
FIG. 1 is an isometric depiction of a power tool assembly constructed and operated in accordance with various embodiments of the present disclosure.

The present disclosure is generally directed to improvements in the manner in which maintenance and repair operations may be carried out adjacent high voltage power lines.

In the power line maintenance and repair industry, it is common to utilize hot sticks (insulated poles) with implements at one end thereof to enable workmen to grasp and manipulate articles adjacent to and in contact with high voltage power lines.

A problem associated with the use of an electrically powered tool, such as a driver, saw, crimper, etc., mounted to the end of a hot stick is the potential for damage to the tool responsive to coronal discharge as the tool is brought into proximity with the power line. Thus, many power line maintenance and repair operations have utilized manually operated tools which are mounted to hotsticks and which are manipulated by hand.

Various embodiments of the present disclosure are generally directed to an improved power tool assembly. In some embodiments, a power tool is mounted to the end of an insulative hotstick. The power tool has a housing which encloses at least a motor and an electronic control module. These components are protected from damage as the power tool is brought into proximity with a high voltage power line. The housing includes a first electrically conductive shield as a layer of nominally continuous conductive material that surrounds the components disposed therein.

The power tool utilizes a removably reattachable battery pack, such as NiCAD or lithium rechargeable batteries, to supply electrical power for use during operation of the power tool. While not necessarily required, the battery pack may be a standardized, commercially available pack. The housing (and the first shield) may be open at one end to slidingly receive engagement of the battery pack.

A protective boot comprising a rigid or flexible cover is supplied to cover the battery pack once the battery pack has slidingly engaged the power tool housing. The boot may include one or more locking features that establish a positive locking engagement with the housing of the power tool. The boot includes a conductive layer that forms a second shield that, combined with the first shield, provides protection to the assembled power tool from coronal discharge. At least one conductive shunting path is established between the first and second shields to form a combined overall shield.

In some embodiments, the boot is flexible and includes a conductive layer of elastomer with embedded conductive particles. Affixed to the conductive layer may be an outer layer of elastomeric fabric such as formed of elastane (Spandex) which is a polyurethane-polyurea copolymer or similar material. The fabric (when used, and more generally, the boot itself) may be provided with an appropriate color such as orange to provide a visual indication for safety personnel to confirm compliance with safety procedures (e.g., installation of the boot). Warning indicia may be printed on the outside of the boot to further ensure compliance.

The boot can thus provide two primary functions: first, it combines with the first shield of the housing of the power tool to nominally fully enclose the power tool with a conductive shield thereby protecting the assembled power tool from damage resulting from coronal discharge. Second, it separately interlocks with the housing to ensure the battery pack does not inadvertently become dislodged from the housing during manipulation by a user.

A non-conductive communication link extends between the electronic control circuit and a user interface control circuit supported at a proximal end of the hot stick. The communication link can take a variety of forms such as one or more fiber optic strands, laser links, hydraulic lines, etc.

The user interface can include a user depressible trigger to vary an amount of power applied to the power tool to, for example, vary torque generated by the tool. The user interface may further include one or more LEDs or similar visual indicators to provide status indications to the user such as a powered state of the tool, a state of ongoing communications between the user interface and the tool, etc.

In yet further embodiments, an interlink mechanism is provided that ensures that the power tool is not operative unless the boot is in place on the battery pack. A microswitch or other mechanism may be used to this end.

It follows that these and other embodiments set forth herein enable repair personnel to safely manipulate and remotely activate a power tool to carry out necessary maintenance actions proximate a high voltage power line in a fast, efficient and safe manner. It is contemplated that the various embodiments can be utilized for servicing power lines of substantially any voltage, including voltages in the range of from about 480 volts, V to around 1 million volts (1 MV) or more. While the embodiments are particularly suited to enabling the power tool to survive coronal discharges from alternating current (AC) lines, the embodiments further provide protection for direct current (DC) power lines. It will be recognized that reference herein to power lines include other high voltage power equipment including transformers, relays, switches, etc.

These and other features of the various embodiments disclosed herein can be understood beginning with a review of FIG. 1 which shows a power tool assembly 100 suitable for use in carrying out maintenance and repair operations adjacent high voltage power lines. The power tool assembly 100 includes an electrically driven power tool 102 mounted to a distal end of an insulative pole (e.g., "hotstick") 104. A proximal (user) end of the hotstick 104 includes a user interface 106 which may include a handle 108 and a depressible trigger 110. Other user interface configurations can be used as required. An intermediate portion 112 of the hotstick 104 between the proximal and distal ends is formed of electrically insulative material to insulate the user from the power tool 102.

The power tool 102 is characterized as a power driver having a collet 114 adapted to rotate in a selected direction responsive to control inputs supplied by the user via the user interface 106. A suitable tool attachment, such as a socket (not separately shown), may be attached to the collet 114 to carry out a desired application of torque to a workpiece (such as a threaded fastener, also not separately shown).

It will be appreciated at this point that the illustration of a power driver as the power tool 102 is merely exemplary and is not limiting. Substantially any number of different types of power tools can be utilized in accordance with the present discussion, including tools that provide rotary, reciprocal or path-based motion of tool attachments such as saws, drills, crimpers, etc. It is not necessarily required, however, that the electrical load of the power tool be characterized as a motor, so that the power tool may be alternatively configured to provide little or substantially no mechanical motion at all such as sensors, cameras, etc.

The electrical load and control electronics of the power tool 102 are supplied with electrical power from a power source 116 (shown in broken line fashion). The power source 116 may be a rechargeable battery pack that can slidingly engage a housing 118 of the power tool 102. As explained in greater detail below, a protective boot 120 surrounds the power source 116 and secures the power source to the power tool housing 118.

Figure 2:
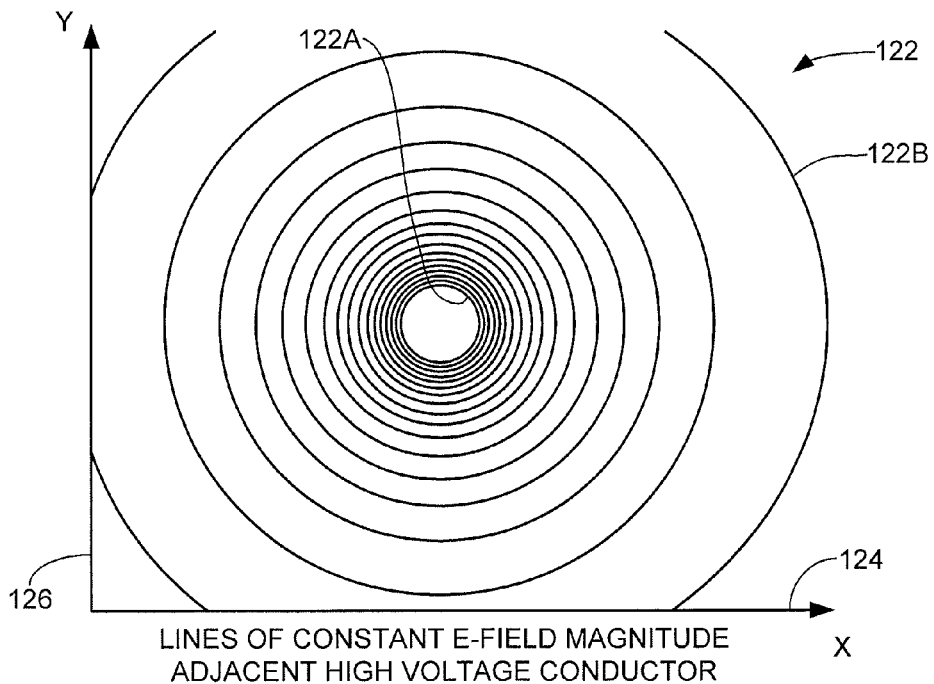
FIG. 2 is a graphical representation of exemplary electromagnetic fields an energized high voltage power line (conductor) adjacent which the power tool assembly of FIG. 1 can be operatively used.

FIG. 2 is a generalized graphical representation of electromagnetic fields that surround an energized high voltage power line (not separately shown). Lines of constant field magnitude 122 are plotted against respective x-y axes 124, 126.

The intensity of the electromagnetic field (E-field) will depend upon a number of factors including the voltage of the line. In one example, lines 122A nearest the conductor may have an E-field magnitude on the order of about $2.1 \times 10^6$ V/m (volts/meter), while lines 122B farther from the conductor may have an E-field magnitude on the order of about $0.6 \times 10^6$ V/m.

Figure 3:
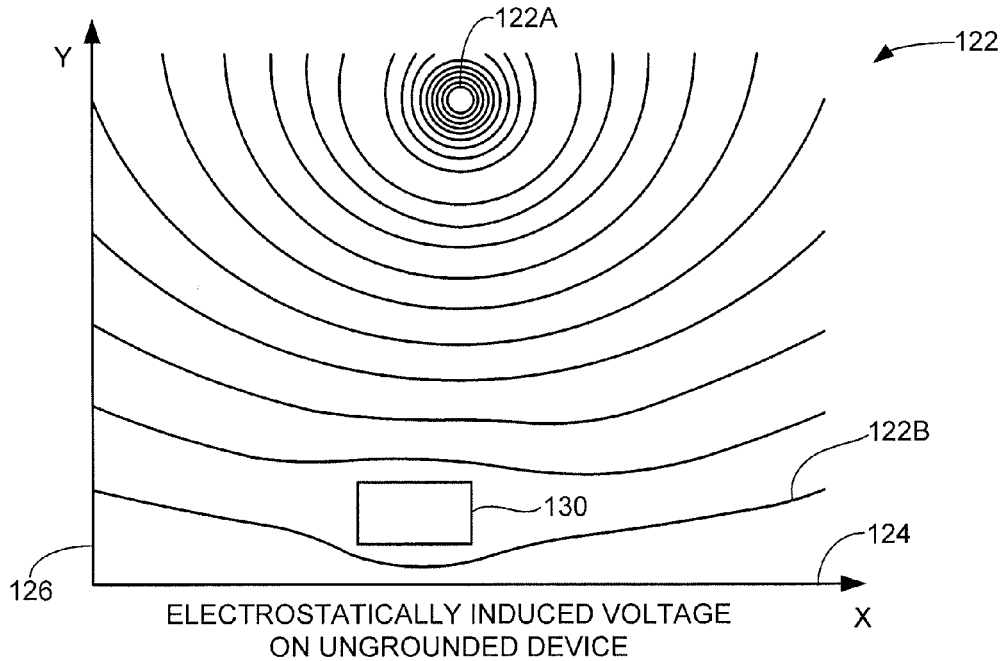
FIG. 3 is a graphical representation of electrostatically induced voltages as a device such as the power tool assembly of FIG. 1 is brought into proximity to the high voltage power line of FIG. 2.

FIG. 3 generally corresponds to FIG. 2 and shows distortion in the lines of constant field magnitude 122 in the presence of an adjacent ungrounded object 130, such as the power tool 102 of FIG. 1. It can be seen that the object will tend to develop a differential voltage between the end of the object closest to the high voltage conductor and the end furthest from the conductor. The magnitude of this voltage differential will tend to increase as the object is brought closer to the conductor. At some minimum distance, the density of the electrostatic field will exceed the breakdown voltage of the air gap between the object and the conductor, resulting in a coronal discharge from the conductor to the object.

The differential voltage, or gradient, between the opposite ends of the object will cause current to flow through any electrical conductors contained within the object. These may include motor windings, screws, circuit components, circuit boards and/or batteries. The flow of current through the object will either disrupt or permanently damage the object's components.

Large conductive surfaces, such as the battery casings of rechargeable battery packs or the copper ground and power planes within circuit boards become virtual grounds when referenced to the higher potential E-field of the portion of the object 130 closest to the high voltage conductor, and are therefore particularly suited to high surges of current during a coronal discharge.

Figure 4:
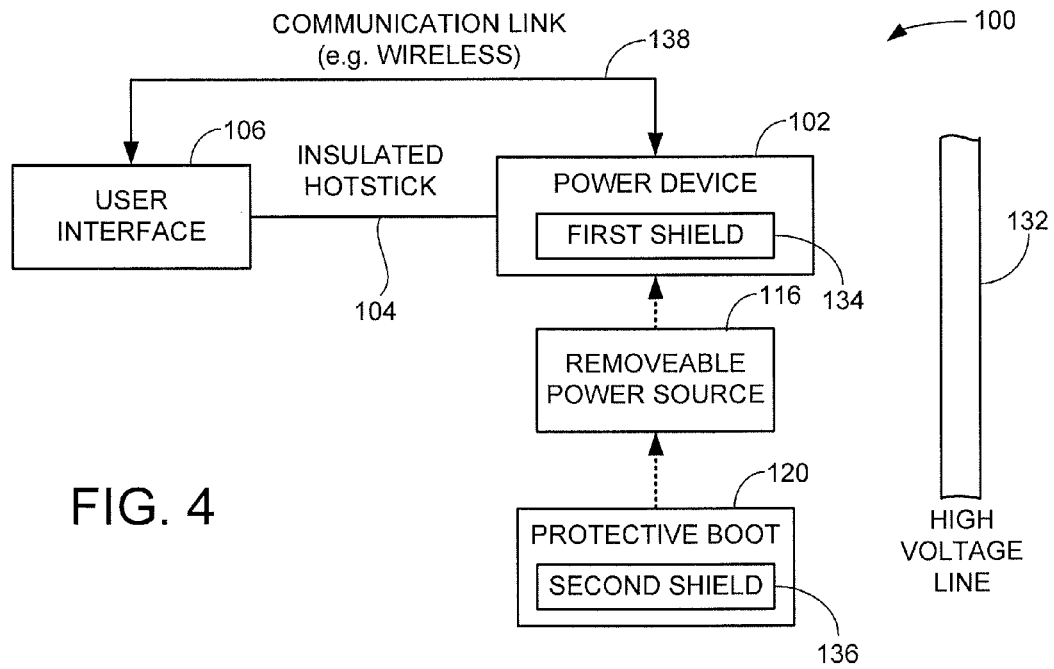
FIG. 4 is a functional block representation of the power tool assembly of FIG. 1 in conjunction with the high voltage power line of FIGS. 2-3.

The power tool assembly 100 is adapted to protect against these and other effects and enable the power tool 102 to successfully operate proximate to (or even in contact with) a high voltage power line. FIG. 4 is a functional block representation of the power tool assembly 100 of FIG. 1 adjacent a high voltage power line 132.

The power tool 102 (also referred to herein as a "power device") includes a first conductive shield 134 which surrounds various components within the power tool. As explained below, the first shield (also referred to as a "housing shield") may be supported by an interior surface of the power tool housing 118 (FIG. 1) and may be open at one end to accommodate sliding insertion of the removable power source (battery pack) 116.

The protective boot 120 from FIG. 1 includes a second shield 136 (also referred to as a "boot shield") which surrounds the battery pack 116. The first and second shields 134, 136 cooperate to form a combined shield that nominally fully encloses the power tool 102, thereby protecting the power tool from coronal discharge effects.

A communication link 138 is established between the power device 102 and the user interface 106. The communication link can take a variety of forms. In one embodiment, the communication link 138 is a two-way radio frequency (RF) spread spectrum frequency hopping digital signal which is operative within a range of from about 375 megahertz, MHz ($375 \times 10^6$ Hz) to about 5 gigahertz, GHz ($5 \times 10^9$ Hz).

Figure 5:
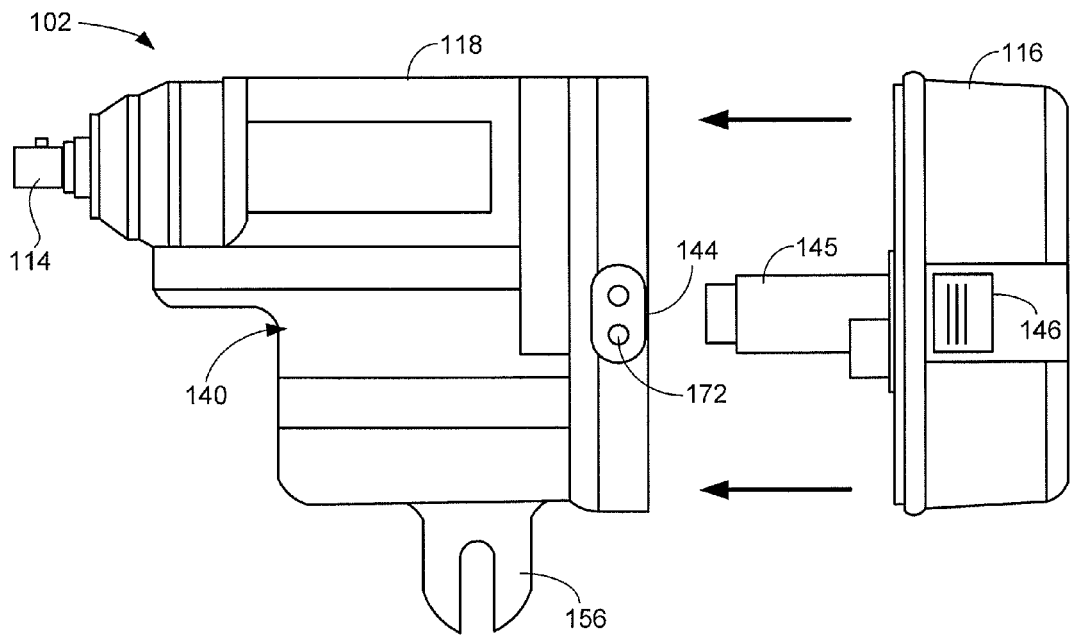
FIG. 5 is an isometric elevational view of a power tool of the arrangement of FIG. 4, the power tool characterized as a rotary driver.
Figure 6:
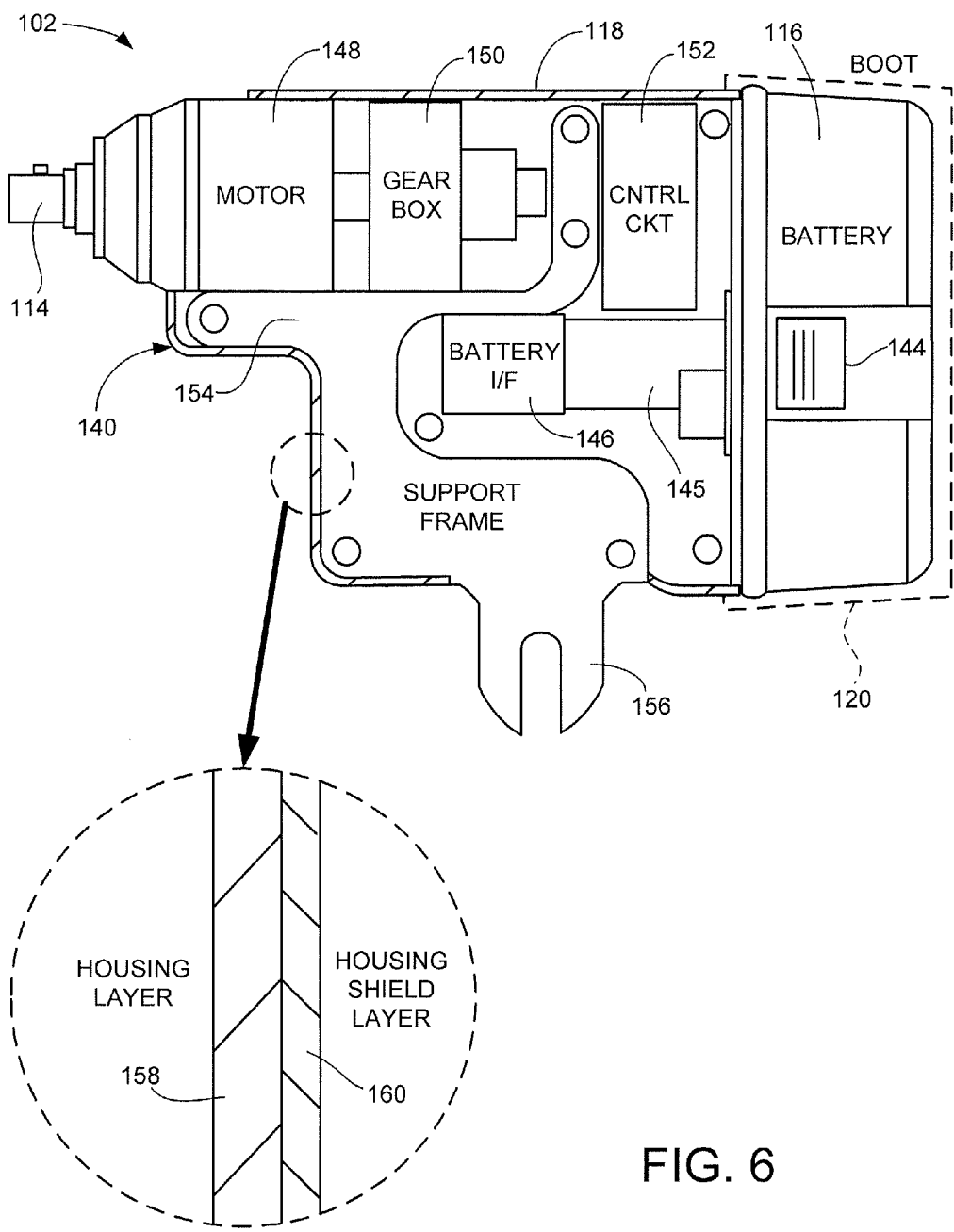
FIG. 6 is a generalized cross-sectional representation of the power tool of FIG. 5.

FIGS. 5 and 6 depict the power tool 102 of FIG. 4 in some embodiments. FIG. 5 illustrates sliding insertion of the rechargeable power source (battery pack) 116 into the power tool housing 118. FIG. 6 is a cross-sectional depiction of the battery pack 116 in a fully inserted position and the installation of the protective boot 120 thereon.

The power tool 102 includes a main unit 140 adapted to receive the aforementioned battery pack 116. In some cases, the battery pack 116 uses rechargeable NiCAD or lithium batteries, and may be a standard battery pack commercially available from one or more sources of conventional power tools.

An exemplary latching mechanism 142 of the housing 118 (see FIG. 5) cooperates with a corresponding latching mechanism 144 of the battery pack 116 to secure the battery pack upon installation. Any suitable latching arrangement can be used. Because of the additional latching operation provided by the protective boot 140, latching of the battery pack into the housing is contemplated but not necessarily required.

As shown in FIG. 6, a neck portion 145 of the battery pack extends into the housing 118 to engage a battery interface connector 146. Other major components within the main unit 140 of the power tool 102 include an electrical motor (driver) 148, a transmission gear assembly ("gear box") 150, and an electronics module (control circuitry) 152.

A conductive support frame 154 extends through the main unit 140 to provide a framework to support these various components. The support frame terminates at a u-shaped coupling 156 adapted to mate with the distal end of the hotstick 104 (see FIG. 1). Other components and configurations can be used as desired.

As further shown in FIG. 6, the housing 118 may be formed of a layer of rigid support material 158, such as plastic or metal. The housing shield 134 (FIG. 4) may be formed from a corresponding layer of conductive material 160. The conductive layer 160 may comprise copper (Cu), gold (Au), silver (Ag), nickel (Ni), alloys thereof, or other suitable conductive materials.

The conductive layer 160 may be sprayed onto the interior surface of the housing support layer 158 during manufacture to nominally coat the entirety of the housing 118. Other configurations are contemplated, however, including an intervening space between some or all of the housing shield 134 (FIG. 4) and the housing 118, and the use of multiple conductive layers such as in the form of a laminate. The respective thicknesses of the layers 158, 160 can vary over the relative dimensions shown in FIG. 6.

Figure 7:
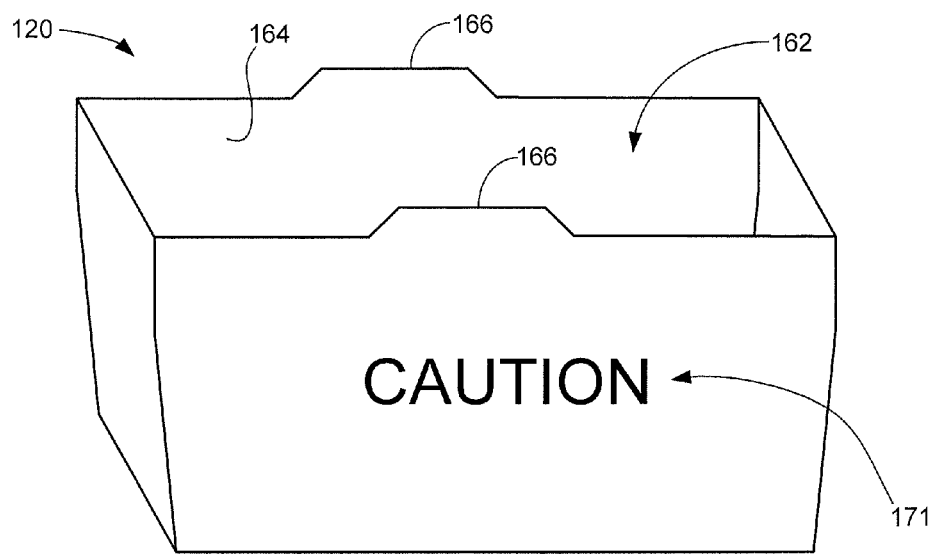
FIG. 7 is an isometric depiction of the protective boot of FIG. 4 in accordance with some embodiments.

FIG. 7 is a generalized isometric depiction of the protective boot 120 in accordance with some embodiments. It will be appreciated that the boot can take a variety of shapes and forms depending on the requirements of a given application. The boot 120 is sized and shaped to surround the battery pack 116 so that the battery pack nests within an interior recess 162 of the boot 120. Interior walls 164 that form the recess 162 may contactingly engage the battery pack, or an intervening gap may be formed therebetween. Tabs 166 may extend upwardly as shown to engage portions of the housing as described more fully below. The size, shape and extent of the tabs 166 can vary as desired.

The protective boot 120 may be rigid, semi-rigid or flexible as required. In some embodiments, the protective boot 120 includes an outer cloth layer 168 and an inner conductive layer 170. The outer cloth layer 168 may be formed of an elastomeric fabric such as elastane (Spandex) which is a polyurethane-polyurea copolymer. Other materials may be used, including electrically conductive or insulating materials. In some cases, the outer layer may instead be a layer of injection molded or thermoset dipped plastic, or other rigid/semi-rigid material.

The inner conductive layer may be formed of a layer or latex or other elastomeric material in which conductive particles are embedded. As with the housing conductive layer 160, the boot conductive layer 170 may be formed of Cu, Ni, Ag, Au or other conductive particles.

Figure 8:
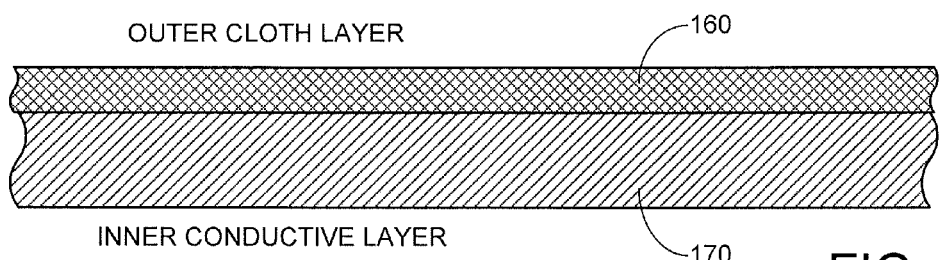
FIG. 8 is a cross-sectional view of a layer of the protective boot of FIG. 7.

The inner surface of the boot 120 (e.g., interior sidewalls 164 in FIG. 7) may be the exposed boot conductive layer 170, or may comprise another layer sandwiched onto the conductive layer. The outer surface of the boot may be the fabric layer 168 or some other layer. For example, the boot 120 may be formed solely by the conductive layer 170. It is contemplated, however, that the outer surface of the boot may be selected to be electrically insulative for safety reasons. As before, the respective thicknesses of the layers 168, 170 shown in FIG. 8 are merely exemplary and are not limiting.

In other alternatives, the boot 120 and/or the power tool housing 140 can be formed using an injection molding process by adding an electrically conductive filler material to the injected plastic or other molded material. Conductive particles such as but not limited to carbon (C), silver (Ag), copper (Cu) and/or nickel (Ni), or alloys thereof, can be added to the plastic (or other molded material) to provide a conductive molded boot and/or housing component. Alternatively, as noted above the boot 120 and/or the housing 140 can be formed directly of metal or other conductive material.

The outer surface of the boot 120 may be provided with an appropriate color, such as fluorescent orange, to provide a visual indication for safety personnel to confirm compliance with safety procedures (e.g., installation of the boot). Warning indicia such as represented at 171 may be printed on the outside of the boot to further ensure compliance.

Figure 9:
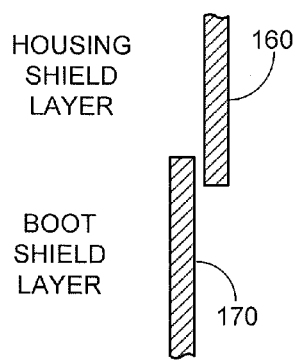
FIG. 9 depicts an interface between the housing shield of the power device and the boot shield of the protective boot.

As noted above, the respective housing conductive layer 160 and the boot conductive layer 170 cooperate to form a combined conductive shield that nominally surrounds the power tool 102. As shown in FIG. 9, the boot conductive layer 170 may partially overlap the housing conductive layer 160 along the uppermost edges of the boot 120. Some separation distance may be provided between the respective layers 160, 170, such as by the thickness of the rigid housing layer 158 (see FIG. 6).

Figure 10:
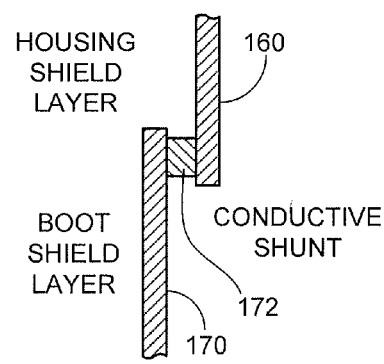
FIG. 10 represents a conductive shunt contactingly disposed between the housing and boot shields.

In at least some embodiments, one or more conductive shunts 172 affirmatively interconnect the respective layers 160, 170, as shown in FIG. 10. The shunts 172 may be incorporated into the housing latch mechanism 144, as represented in FIG. 5, and correspond to conductive extensions (e.g., rivets, etc.) that extend through to contactingly engage the respective layers 160, 170.

Figure 11:
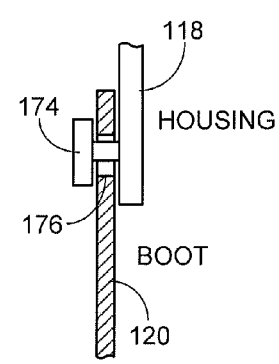
FIG. 11 illustrates on exemplary latching mechanism used to secure the protective boot to the housing of the power tool.

As noted above, in some embodiments the boot 120 affirmatively locks to the housing 118 of the power tool 102. FIG. 11 shows one example locking (latching) mechanism in which a projection 174 extends from the housing 118 to engage a corresponding slot 176 in the boot 120 in a manner similar to a button-hole arrangement. The projection 174 may be a portion of the housing latch mechanism 144, or may be located elsewhere. The slot 176 may be formed in each of the tabs 166 (FIG. 7) or elsewhere. Other securement mechanisms can be used and will readily occur to the skilled artisan in view of the present disclosure.

Figure 12:
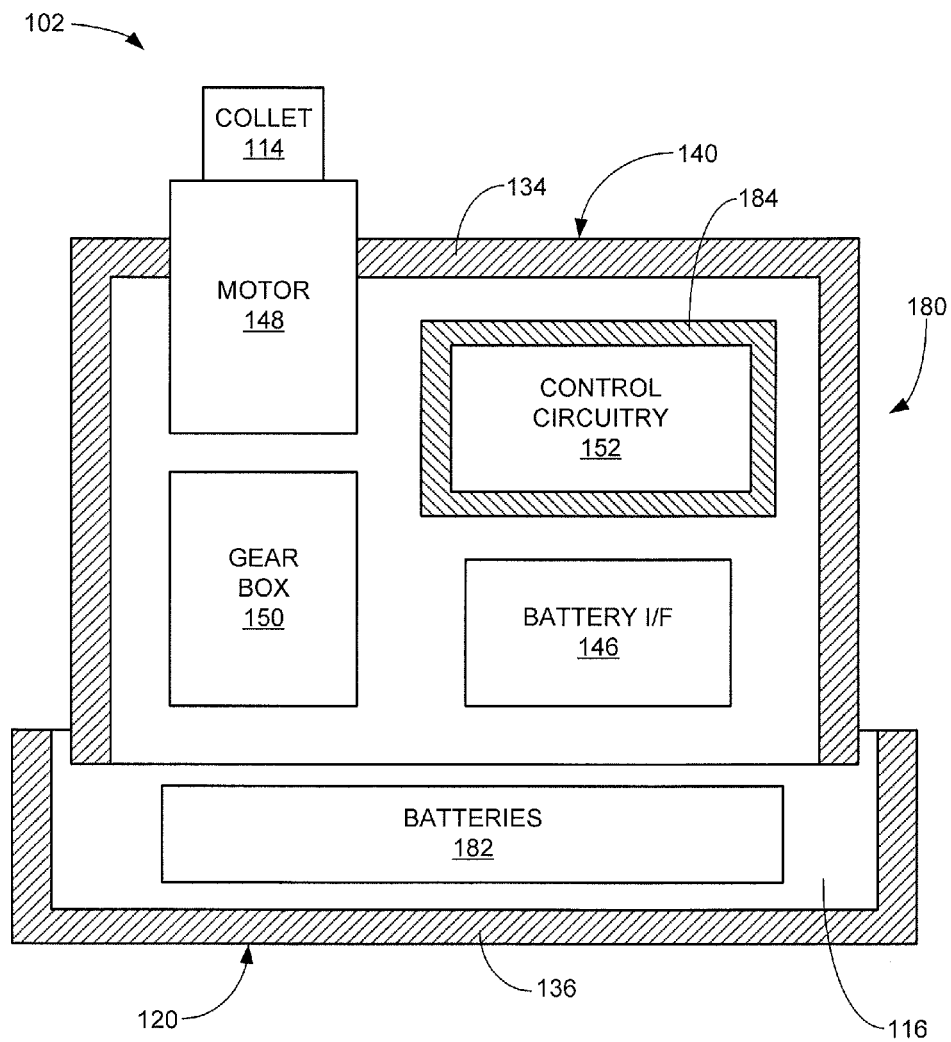
FIG. 12 is a functional block representation of the power tool and the protective boot, illustrating an optional third conductive shield surrounding control circuitry of the power tool in some embodiments.

FIG. 12 is a diagrammatical functional block representation of the power tool 102 in accordance with the foregoing discussion. The conductive shields 134, 136 (formed by the respective layers 160, 170) of the housing 140 and the boot 120 form a combined conductive shield 180 that substantially fully surrounds the power tool 102. It will be noted that, depending upon the configuration of the tool, some portion or portions of the tool may extend through the shield, such as a distal portion of the motor 148. However, providing the motor with a substantially continuous outer conductive layer enables this conductive layer to be incorporated into the combined shield 180.

The battery pack 116 may include a plurality of individual batteries 182. As noted above, the combined shield 180 generally operates to reduce the magnitude of internal surge currents through the tool 102 in the presence of coronal discharge, thereby reducing the likelihood of damage to the batteries 182. In the case of lithium based batteries, such protection may reduce the likelihood of a significant reaction event such as, but not limited to, an explosion.

In further cases, a third conductive shield may be provisioned within the combined shield 180, such as the control circuitry shield 184. As before, the shield 184 may be formed from a nominally continuous layer of conductive material such as but not limited to Ni, Cu, Ag, and Au, and alloys thereof. Other components within the housing 118 may be shielded as required in addition to the control circuitry. It will be recognized that the shield 184 provides further levels of protection against damage due to coronal discharge events.

Figure 13:
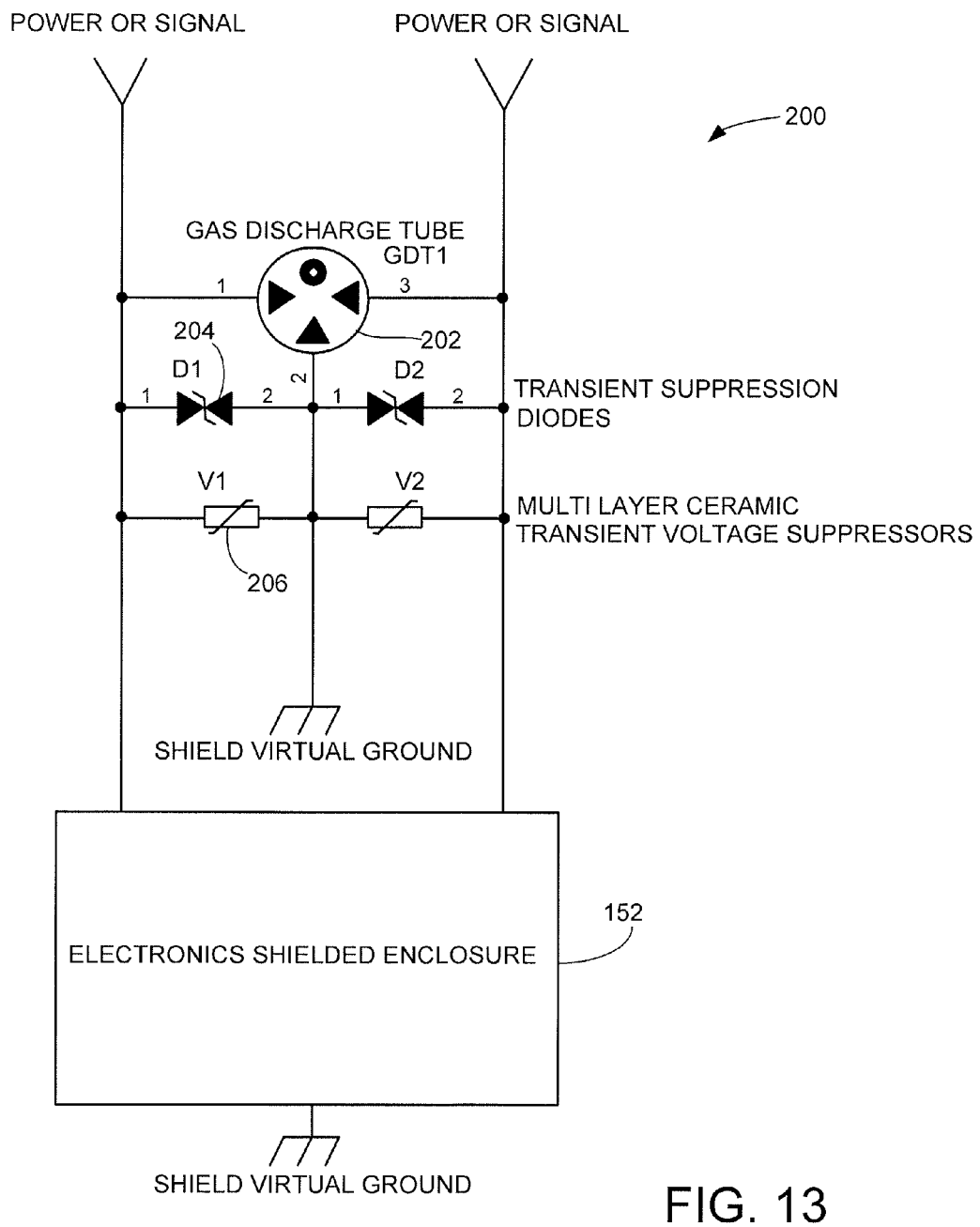
FIG. 13 is a schematic representation of transient suppression circuitry that can be connected between the housing shield and the control circuitry shield of FIG. 12.

Surge protection circuitry may be additionally incorporated into the power tool 102 as desired. An exemplary surge protection circuit 200 is depicted schematically in FIG. 13. Other forms of protection circuitry can be used. In some cases, the circuit 200 may be operatively connected between the combined (main) shield 180 and the control circuit shield 184. The circuit 200 includes various components including a gas discharge tube 202, transient suppression diodes 204, and transient voltage suppressors 206. It is envisioned that these and other types of surge protection circuits can further protect the control circuitry during operation.

Figure 14:
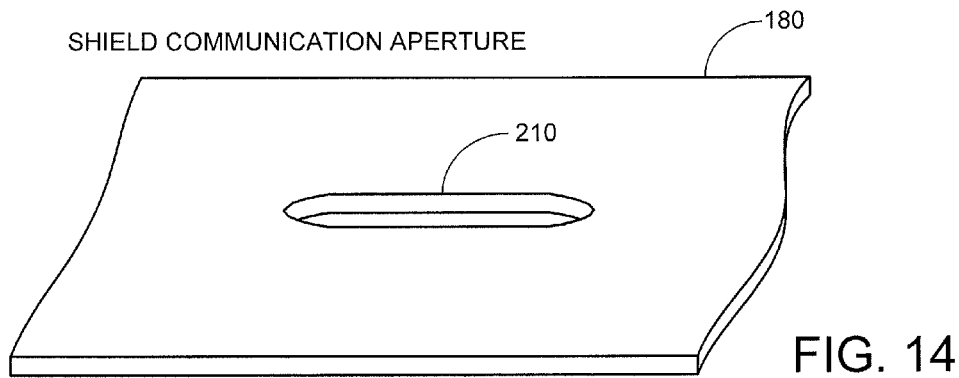
FIG. 14 illustrates an access aperture in the housing shield operative in some embodiments to facilitate the passage of communication signals between the power tool and the user interface of FIG. 1.

Referring again to the diagram of FIG. 12, perfect shielding of the control circuitry 152 would generally tend to prevent communications between the power tool 102 and the user interface 106 (FIG. 1). Accordingly, in at least some embodiments a relatively small communication aperture 210 is provided to extend through the combined (main) shield 180, as depicted in FIG. 14.

As will be recognized, the longest dimension, not the total area, of an opening is used to evaluate the ability of external fields to enter a shielded enclosure, because the openings behave as slot antennas. Equation (1) can be used to calculate the shielding effectiveness, or the susceptibility to electromagnetic interference (EMI) leakage or penetration of an opening in an enclosure:

$$\text{Shield\_Effectiveness (dB)} = 20\log_{10}\left(\frac{\lambda}{2L}\right) \quad (1)$$

where λ represents the wavelength of interest, and L represents the maximum dimension of the opening.

Maximum radiation of EMI through an opening generally occurs when the longest dimension of the opening is equal to one half-wavelength of the interference frequency (0-dB shielding effectiveness). A rule-of-thumb is to keep the longest dimension less than 1/20 wavelength of the interference signal, as this provides 20-dB shielding effectiveness.

Based on empirical data obtained from the electromagnetic noise generated by coronal discharges from a high voltage conductor, the noise floor drops around 375 MHz. Equation (2) can be used to calculate the minimum and maximum size of the opening in the main (Faraday) shield to block the noise, but pass the control signals.

$$\lambda = \frac{c}{f} \quad (2)$$

where λ represents wavelength, c represents the speed of light (299,792,458 m/s) and f represents frequency. Based on equations (1) and (2), the maximum opening length based on the figure of 375 MHz should be approximately 40 mm in order to provide 20-dB shielding effectiveness. With a typical operating radio frequency of 2.4 GHz, the minimum length of the opening should be approximately 62.5 mm in order to provide 0-dB shielding effectiveness. Testing of individual designs can be performed to find the best compromise of the antenna opening versus shielding requirements to provide the highest signal to noise ratio.

Figure 15:
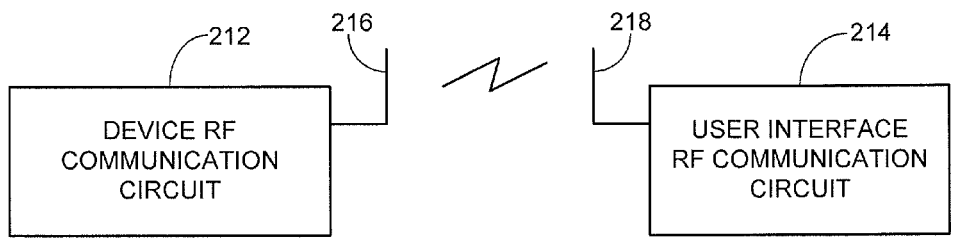
FIG. 15 depicts a radio frequency (RF) wireless communication link used in some embodiments.

FIG. 15 is a functional block representation of the power tool assembly 100 of FIG. 1 in which a wireless communication link (138, FIG. 4) is employed to enable communications between the power tool 102 and the user interface 106. It is contemplated that the power tool and the user interface will each include a respective communication circuit 212, 214 to facilitate two-way transmitter/receiver functions via respective antennas 216, 218. As noted above, RF communications may be feasibly carried out in the noisy environment of high voltage power lines over a range of from about 375 MHz to about 5 GHz or higher. In some embodiments, a nominal frequency of about 2.4 GHz is used, although other values can be selected. A properly sized slot 210 (FIG. 14) will facilitate such wireless communications.

Figure 16:
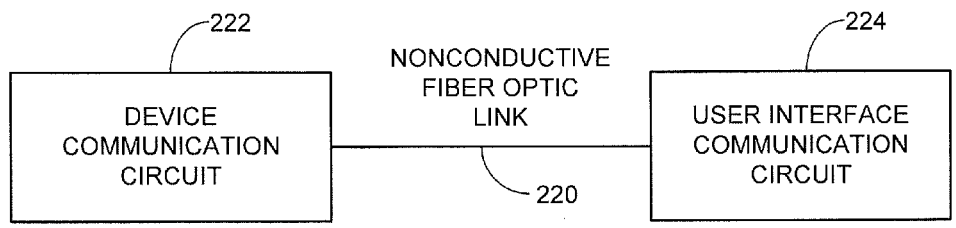
FIG. 16 depicts a non-conductive fiber optic communication link used in other embodiments.

FIG. 16 illustrates an alternative communication link between the power tool 102 and the user interface in which a nonconductive fiber optic link 220 is extended along the interior of the hotstick 104 (FIG. 1). This facilitates communications between respective power device and user interface communication circuits 222, 224. A properly sized slot 210 (FIG. 14) can be used to accommodate physical passage of the fiber optic cable(s) through the main shield 180. Other communication link configurations are contemplated, including but not limited to an optical (e.g, laser) link, hydraulic link, etc. Whatever the form, it is generally advisable that the link be nonconductive to reduce a likelihood of surge currents from passing along the length of the hotstick to the user.

The user interface at the proximal end of the hotstick can include a number of features to facilitate remote operation of the power tool. Such features are set forth more fully in the appended drawings such as a switch or other user depressible trigger mechanism that varies an amount of power applied from the battery pack to the power tool. A resistive ladder network or other potentiometer arrangement can be used to provide a variable analog or digital voltage level to signify a desired power level. A corresponding digital value is transmitted to the power tool such as using the arrangements of FIGS. 15-16 to provide a commanded variable power setting to the power tool. In this way, the amount of torque generated by the power tool can be selectively varied by the user from a range of zero torque (e.g., "off") to a maximum torque (e.g., fully "on") or any of a number of intermediate torque values as required.

When a wireless (e.g., RF) communication link is used, the particular location and mounting orientation of the user interface will not be in a fixed location, but instead can be adjusted along the proximal end of the hot stick. As shown in the accompanying drawings, releasable clamps can be engaged to slidingly and rotationally position the user interface in a location suitable for a particular user. This can further enhance the usability of the power tool assembly, including adjustments for right or left handed users as desired. The user interface can further incorporate other features such as LEDs or other visual indicators to indicate power level status, communication status, etc.

Figure 17:
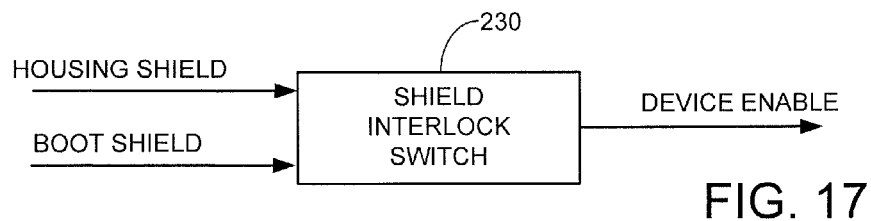
FIG. 17 depicts a shield interlock switch which generates a device enable signal responsive to a detected interlock of the housing and boot shields in accordance with some embodiments.

FIG. 17 is another diagrammatical representation of the power tool 102 in some embodiments. A shield interlock switch mechanism 230 is operably couple to the respective housing and boot shields 134, 136. The mechanism 230 can take a variety of forms including a capacitive switch, a microswitch, a Hall effects sensor, etc.

Generally, the mechanism 230 operates to require the presence of the boot shield 136 prior to enabling operation of the device. In some embodiments, the mechanism 230 may generate a device enable signal to enable operation of the control circuitry 152. In other embodiments, an alarm (not separately shown) may be activated if the mechanism 230 fails to detect the boot shield 136 and the mechanism detects the presence of an adjacent electromagnetic field, such as in the case of a worker raising the power tool toward an energized high voltage power line.

Figure 18:
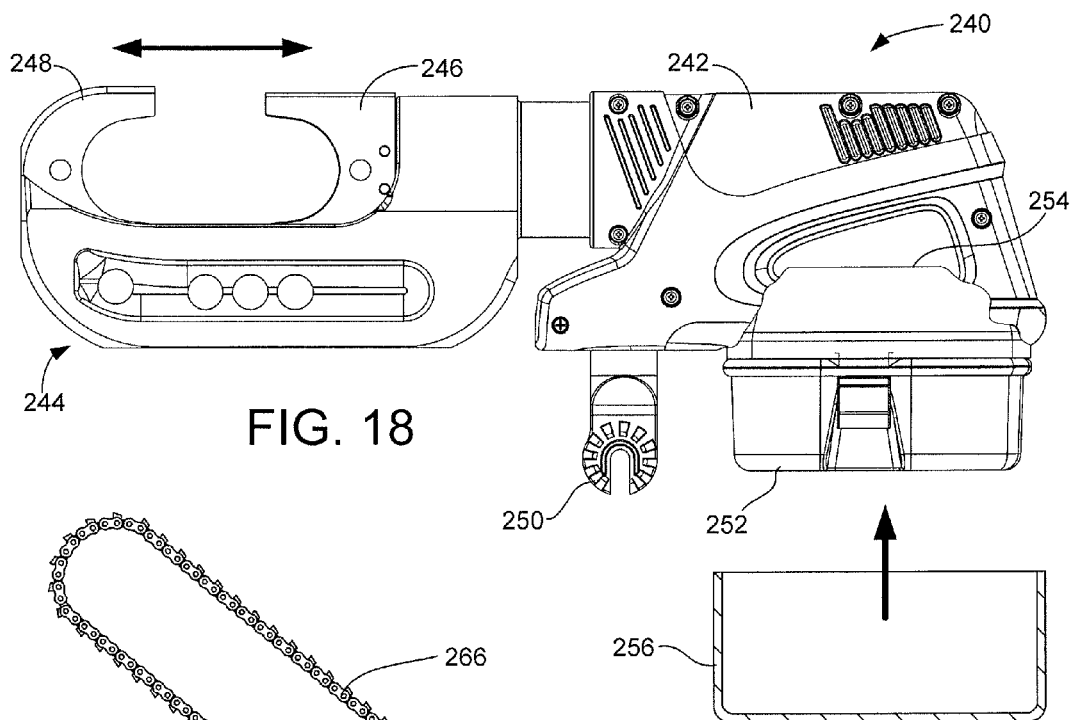
FIG. 18 illustrates another exemplary power tool in accordance with some embodiments, the power tool characterized as a powered crimper.

FIG. 18 depicts another power tool (power device) 240 that can be operated in accordance with various embodiments. The power tool 240 is characterized as a powered crimper used to perform crimping operations to mechanically adjoin power line elements using crimp style connectors (not separately shown). Except as noted below, the powered crimper 240 takes a substantially conventional configuration as known in the art and includes a rigid body 242 and a crimper head 244 with jaws 246, 248 which extend and retract linearly as shown.

The body 242 includes a u-shaped coupling 250 adapted to mate with the distal end of a hotstick as described above (see e.g., FIG. 1). A removable battery pack 252 is supplied for inserting into the body 242 to supply power to the crimper 240. The housing body 242, which is conductive and/or supplied with a conductive coating, is partially cut away along broken line 254 to illustrate interior portions of the body adapted to receive the battery pack 252. A protective boot 256 similar to the boot 120 discussed above is supplied for mating with the body 242 to provide protection to the crimper 240. The protective boot 256 is conductive and/or includes at least one conductive layer to enclose the crimper 240 such as discussed above in FIG. 12.

Figure 19:
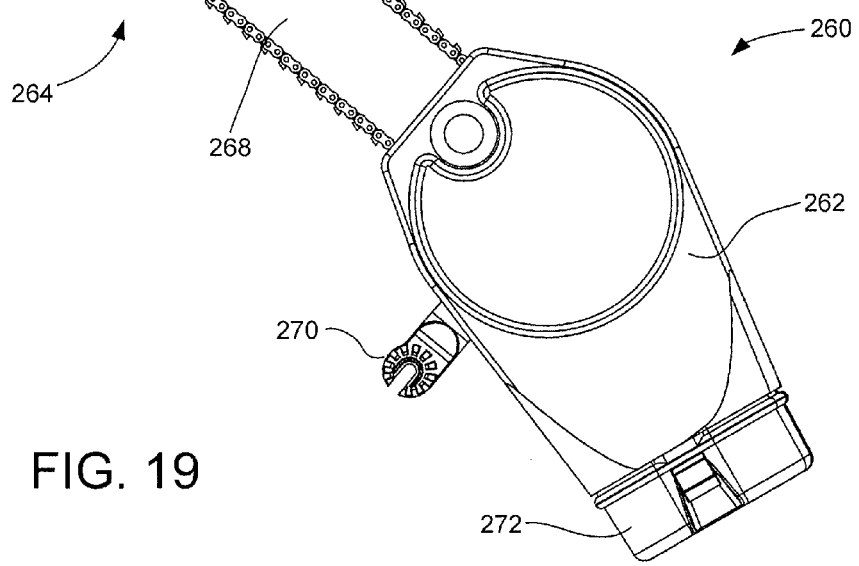
FIG. 19 illustrates another exemplary power tool in accordance with further embodiments, the power tool characterized as a chain saw.

FIG. 19 illustrates another power tool (power device) 260 characterized as a chain saw suitable for use, for example, in clearing brush or other obstructions adjacent a power line. Except as noted herein, the chain saw 260 largely takes a conventional chain saw construction as known in the art and includes a body 262 and a cutting head 264 with an endless cutting chain 266 about a guide plate 268.

As before, a u-shaped coupling 270 mates with a hot stick or other end effector for manipulation of the chain saw 260. A removable battery pack 272 slidingly engages the body 262 to supply electrical power to the saw. While not shown in FIG. 19, a suitable conductive protective boot, such as the boot 256 in FIG. 18, is adapted for placement over the battery pack 272.

The various embodiments discussed above generally contemplate manual manipulation of the respective power tools by a human user using a hot stick or similar end effector. The human user may be positioned in a suitably safe location during such operations, such as from the ground or from an aerial platform (e.g., a bucket, a helicopter, a platform support integrated with the power lines, etc.). These examples are illustrative but are not necessarily limiting.

Figure 20:
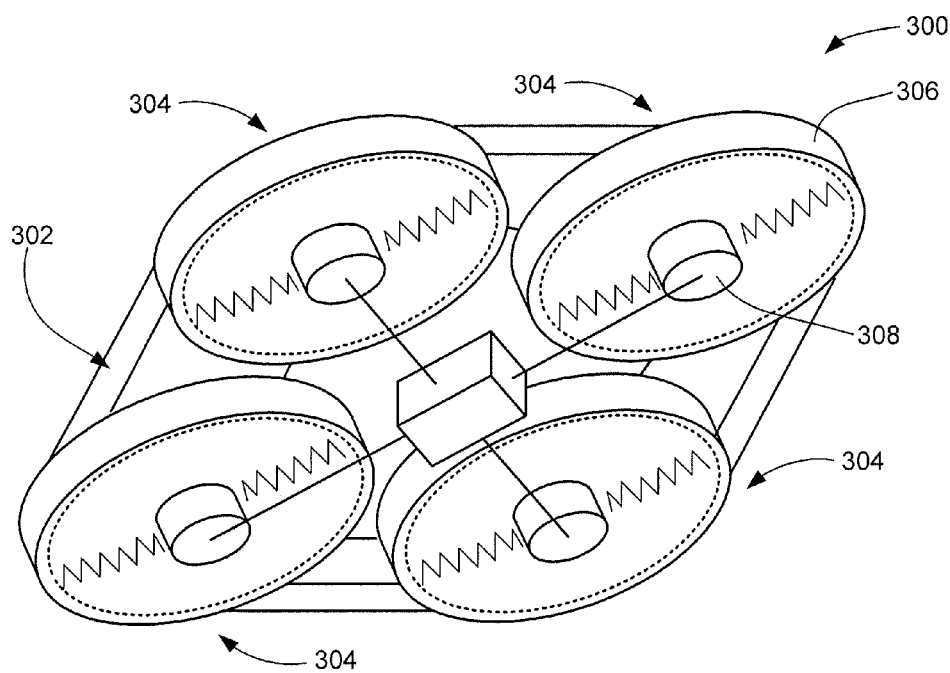
FIG. 20 is a schematic representation of an unmanned aerial vehicle (UAV) constructed and operated in accordance with various embodiments.

Further embodiments contemplate incorporation of the power tool into an unmanned aerial vehicle (UAV) 300, such as represented in FIG. 20. As will be appreciated, UAVs, also sometimes referred to as "drones," remotely piloted aircraft ("RPAs"), autonomous aircraft or semi-autonomous aircraft, are relatively small unmanned aerial (flying) craft that are capable of being flown in a wide variety of environments. UAVs can take any number of sizes, styles and shapes including fixed wing aircraft and rotating wing (helicopter type) aircraft. The simplified UAV 300 in FIG. 20 is thus given for purposes of discussion and is not limiting.

The UAV 300 includes a main body 302 that provides structural support for and which carries the requisite power and control elements to enable the UAV to fly. Four thrust assemblies 304 are coupled to the main body, each thrust assembly 304 including a substantially cylindrical shroud 306 and a thrust generator 308, which may be in the form of a propeller rotated by an electric motor. Actuators (not separately denoted) can be used to vary the angle of the propellers to achieve multi-axial (e.g., x, y and z axes) controlled movement, including hovering in a fixed position. The ability to hover in a substantially stationary position, however, is not necessarily required.

It is contemplated that the main body 302 includes a number of power and control elements to enable autonomous (e.g., preprogrammed) or real-time remote controlled flight. In some embodiments, the main body 302 is provided with a conductive layer and the UAV 300 utilizes a removable power pack that is shrouded using a conductive boot to provide protection against EMI and other coronal discharge effects as discussed above. In this way, the main body 302 can incorporate a power tool, such as in the form or one or more sensors, cameras, etc., and the UAV can be directed to fly along and in close proximity to an expanse of power lines to detect anomalous conditions that require subsequent service.

Accordingly, the embodiment of FIG. 20 generally contemplates the power tool being incorporated into or extending from the UAV body, the power tool shielded by an arrangement that includes a protective boot cover that, in combination with a conductive housing, enables the UAV to fly in close proximity to a power line for servicing operations.

Figure 21:
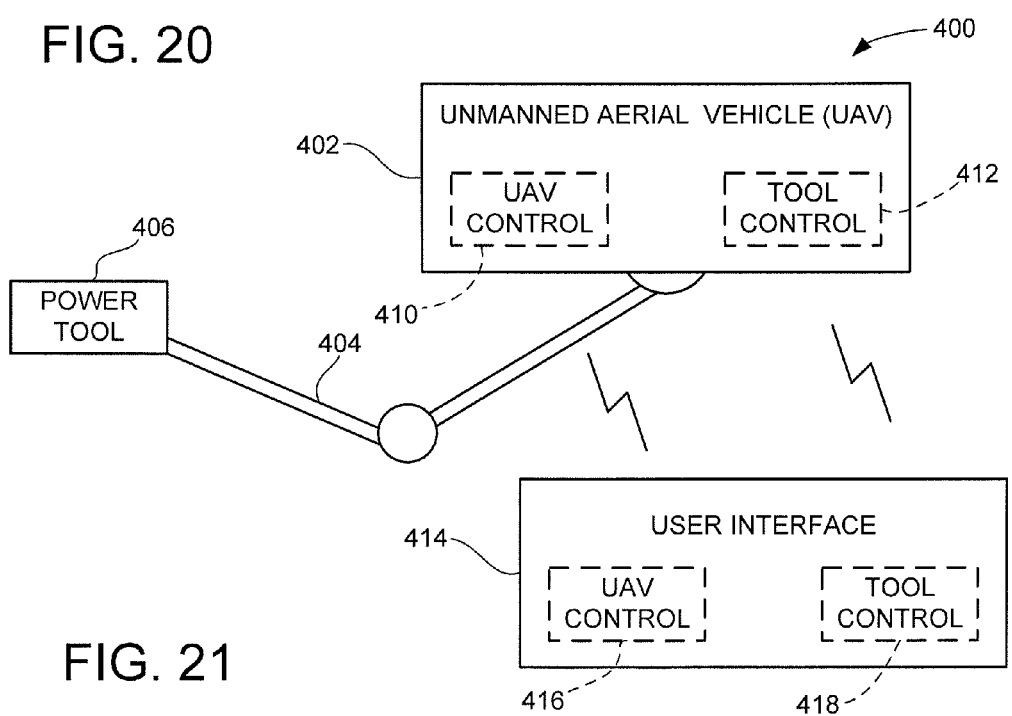
FIG. 21 is a functional block representation of another UAV in accordance with further embodiments.

FIG. 21 shows another UAV 400 in accordance with further embodiments. The UAV 400 may be similar to the UAV 300 in FIG. 20, or may take another form. The UAV 400 includes a main body 402 which, as described above, includes conductive shrouding to protect a power supply used to supply power to the UAV. In addition, an end effector 404, which may take the form of a hot stick, including a non-jointed or multi jointed hot stick, is supported by the main body 402 in a manner as generally shown. A distal end of the end effector 404 supports a power tool (power device) 406 which may take the form of any of the exemplary power tools discussed above.

Enclosed within the UAV main body 402 are a UAV control module 410 and a tool control module 412. A remote user interface 414 includes corresponding UAV control and tool control modules 416, 418. In a manner discussed above, multi-channel RF communication links can be established to provide wireless control signals to the UAV 400 to activate and fly the UAV as well as to manipulate the power tool.

In some embodiments, the power tool 406 may receive electrical power from the power source of the UAV 400. However, it is contemplated that in many embodiments that the power tool 406 will be supplied with its own power source and therefore a protective boot arrangement is supplied as discussed above to protect the power tool against EMI effects as the power tool is brought into a close position proximate a power line by the user of the UAV 400.

Figure 22:
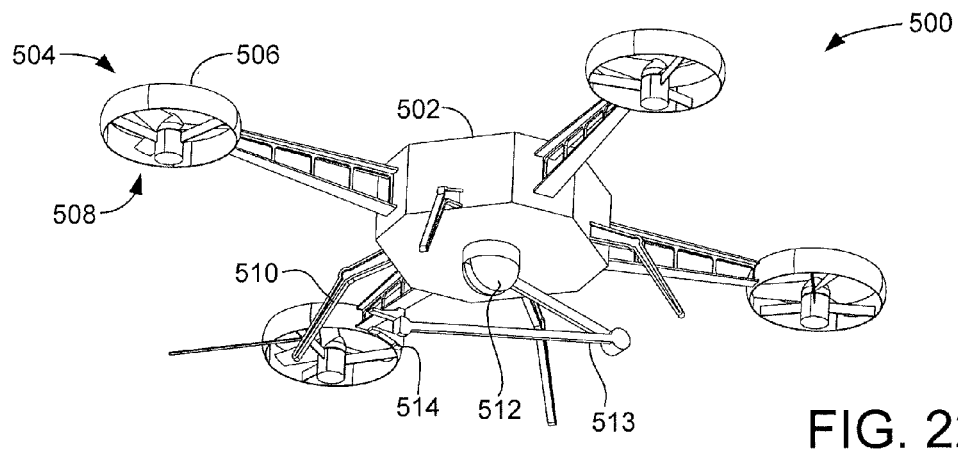
FIG. 22 shows another UAV in accordance with further embodiments.

FIG. 22 provides another UAV 500 in accordance with further embodiments. The UAV 500 is similar to the UAVs 300, 400 discussed above and includes a main body 502 and four thrust assemblies 504 extending from the main body. Each thrust assembly 504 includes a cylindrical shroud 506 and a thrust generator 508. As before, power and control electronic modules, including one or more controllers and communication circuits as discussed above are housed within the main body 502 and protected as described herein. Support legs 510 project from the main body 502 to support the UAV 500 when not in flight.

A multi-axial swivel 512 extends from a bottom surface of the main body 502 and supports an end effector arm 513 having a grasping tool 514 at a distal end thereof. In this embodiment, the grasping tool 514 may carry elements such as a motor and a rechargeable battery as depicted in FIG. 21, or such elements may be housed within the main body 502 and a communication link/mechanical linkage may be supplied to transfer motive operation to the grasping tool. Regardless, it is contemplated that the power tool uses a removable battery that is protected by the protectable boot as described above.

Although not specifically depicted in FIG. 22, the battery may be insertable into a suitable opening in the housing of the main body 502 and covered by the protective boot cover to provide a combined shield against EMI discharges as the UAV approaches a power line. Different tools may be mated to the main body 502 to support different tasks, including the various different types of tools discussed above (e.g., drivers, crimpers, saws, cameras, sensors, etc.). The same battery may be used to power both the UAV and the power tool, or separate power source can be used.

Figure 23:
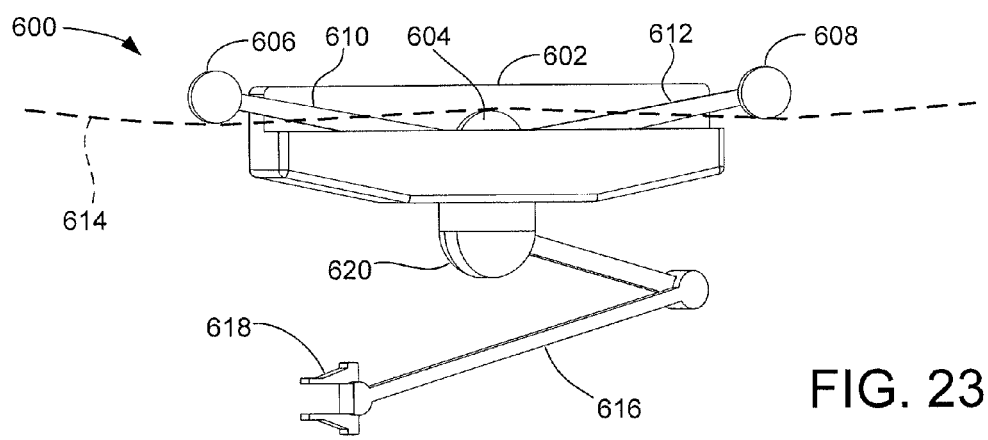
FIG. 23 shows a mobile line robot in accordance with further embodiments.

FIG. 23 shows a mobile line robot 600 in accordance with further embodiments. The robot 600 is remotely controlled as generally depicted in FIG. 21. However, unlike the UAV mechanisms of FIGS. 20-22, the robot 600 is adapted as a mobile vehicle to travel along a power line to a selected location at which point a repair operation can be carried out using a power tool.

The robot 600 includes a main body 602 which encloses various elements of interest such as a motor, a power source, communication circuitry and a power tool. A drive roller (wheel) 604 is coupled to the motor, and a pair of idler rollers 606, 608 are supported by spring loaded idler arms 610, 612. In this configuration, the respective rollers and arms engage a power line, generally represented by dotted line 614, so that the idler wheels 606, 608 exert a downwardly biasing force upon the power line and bring the drive roller 604 into engagement against the underside of the line.

While the line 614 in FIG. 23 is shown in a discontinuous fashion to illustrate the routing path for the line, it will be understood that in practice, the line will tend to remain in a substantially linear extent (e.g., nominally straight) and the idler rollers 606, 608 will be deflected upwardly from the rest position indicated in FIG. 23 when the robot is attached to the line.

An articulating end effector 616 with grasping tool 618 extends from a multi-axial swivel 620 in a manner similar to discussed above in FIG. 22. This forms a power tool which is protected as discussed above, and may be switched out as required.

In some embodiments, a human operator can access a power line manually from a suitable platform and attach the robot 600 thereto. The operator can thereafter "drive" the robot 600 to the required location to carry out the requisite servicing operation (including a line inspection operation). Depending on the environment, the configuration of the robot 600 may permit unobstructed access by the robot to substantially the entire length of the power line over a given span from one support (e.g., tower) to the next. In other embodiments, the robot may be configured to negotiate various obstacles such as power line supports, relays and other equipment and thereby travel along a given power line over multiple spans.

Figure 24:
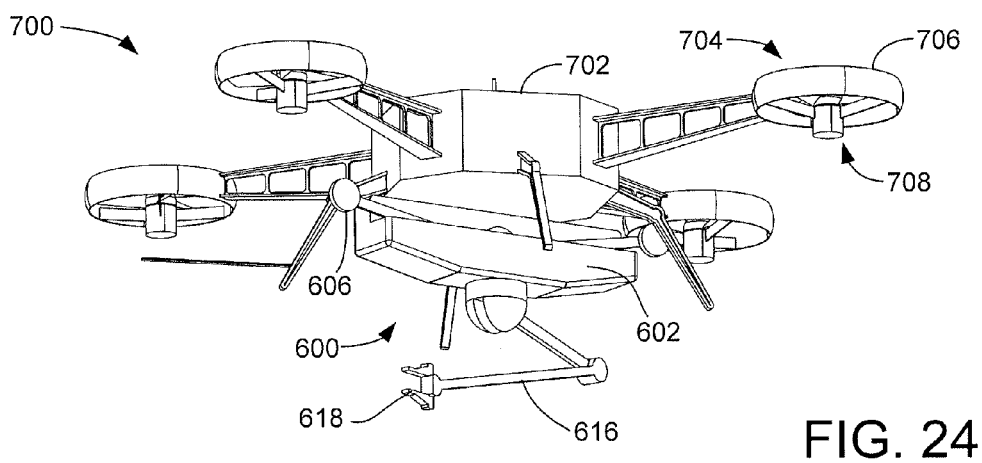
FIG. 24 shows the mobile line robot of FIG. 23 in combination with a delivery UAV in accordance with further embodiments.

FIG. 24 shows another embodiment in which a delivery UAV 700 is used to deliver the robot 600 from FIG. 23 to a given position on a power line. The UAV 700 is generally similar to those discussed above and includes a main body 702 and four thrust assemblies 704 with shrouds 706 and thrust generators 708. An engagement/disengagement mechanism enables the UAV 700 to carry the robot 600 as a payload.

A user from a remote location can activate the UAV 700 to fly up and deposit the robot 600 onto a given power line at a suitable delivery location, and then direct the UAV 700 to withdraw to a standby location. The user activates the robot 600 to travel to a second location and carry out a service operation. Once completed, the user directs the robot to advance to a retrieval location, and directs the UAV to retrieve the robot. Suitable sensors and actuators can be used to enable the user to align and engage the robot with the power line and to engage and disengage the robot from the UAV. Each of the operative elements are shielded as described herein to enable the elements to survive EMI interference and coronal discharge effects as the elements are brought into proximity with and are removed from the vicinity of the power line.

Field test results have confirmed that power tool equipment configured in accordance with the present disclosure can survive extremely high voltage environments. In one series of tests, power tools supported by telescopic hot sticks were able to successfully operate in an environment with nominally 500 kV (500,000 volt phase to phase) power line levels with no interference in the communication links as the power tools were operated adjacent to and in contact with such lines. It was demonstrated that the tools could be selectively activated and deactivated at will even in the presence of significant levels of continuous arcing to the power tools.

It is contemplated that the various embodiments described herein can successfully operate over a wide range of power line voltages, including from around 480V up to around 1 million volts (1 MV) or more. The same equipment can be operated over this entire range, or over a substantial portion of this range. In some cases, a first version of equipment may be supplied for relatively lower voltages (e.g., such as but not limited to a range of from about 480V up to about 50,000V) and a second, more hardened version of the equipment may be supplied for relatively higher voltages (e.g., such as but not limited to a range of from about 50,000V up to about 1,000,000V).

It will now be appreciated that the various embodiments presented herein can present a number of advantages over the prior art. The combined shield supplied by the protective boot as embodied herein can reduce the likelihood of damage to a power tool, enabling automated servicing operations (e.g., maintenance, repair, replacement, installation, sensing, inspection, etc.) in an environment adjacent high voltage power lines.

The protective boot provides safety benefits by ensuring that a removable power source does not become inadvertently dislodged and fall to the ground during manipulation. The visible nature of the boot provides a ready indication of installation. Monitoring circuitry can provide further indication to the user via the user interface of the operability of the shield. Both human manual manipulation of the power tool (such as via hot stick) and remote manipulation via robotic mechanisms (such as via a UAV or a line robot) are contemplated.

For purposes herein, the term "conductive" will be understood consistent with the foregoing discussion to provide sufficient electrical conductivity (Siemens per meter, S/m) to provide electromagnetic shielding for electronic components as described herein within an enclosure in the presence of an electromagnetic force from an adjacent power line of at least about 10,000 volts (V) at a distance of 1 meter (m) or less.

It is to be understood that even though numerous characteristics and advantages of various embodiments of the present disclosure have been set forth in the foregoing description, together with details of the structure and function of various embodiments disclosed, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A power tool assembly comprising:
    a power tool comprising a housing which encloses at least an electrical load and a control electronics circuit to activate the electrical load, the housing comprising a first shield as a continuous layer of conductive material that nominally encloses the electrical load and the control electronics circuit, the first shield open at a battery pack receiving slot of the housing;
    a removable battery pack mateable with the battery pack receiving slot of the housing to supply electrical power for use by the electrical load and the control electronics circuit;
    a removable boot adapted to surround the removeable battery pack upon engagement with the housing, the boot comprising a second shield as a continuous layer of conductive material that nominally encloses the removeable battery pack and contactingly engages the first shield to form a combined shield that nominally encloses the electrical load, the control electronics circuit and the battery pack;

an insulative hot stick having opposing proximal and distal ends, the power tool supported by the distal end; and a user interface supported by the proximal end of the insulative hot stick comprising a communication circuit that communicates with the control electronics circuit via a communication link to selectively activate the electrical load, the communication link comprising at least one non-conductive fiber optic cable that extends along a length of the insulative hot stick between the proximal and distal ends.

2. The power tool assembly of claim 1, wherein the boot further comprises at least one locking feature that engages a corresponding feature of the housing to mechanically secure the boot to the housing to retain the boot in said engagement with the housing.

3. The power tool assembly of claim 1, wherein the electrical load comprises an electric motor.

4. The power tool assembly of claim 1, wherein the housing further comprises a continuous layer of electrically insulative material affixed to an exterior surface of the layer of conductive material forming the first shield, and the boot further comprises a continuous layer of electrically insulative material affixed to an exterior surface of the layer of conductive material forming the second shield.

5. The power tool assembly of claim 1, further comprising a suppression circuit disposed between the first and second shields.

6. The power tool assembly of claim 1, further comprising an interlock mechanism that prevents activation of the electrical load by the control electronics circuit responsive to absence of the boot.

7. The power tool assembly of claim 1, wherein the combined shield forms a Faraday shield configured to protect the electrical load, the control electronics circuit and the battery pack from a coronal discharge from an adjacent high voltage power line carrying an alternating current (AC) voltage in a distribution range of from about 480 volts (V) to about 50,000V nominal phase to phase.

8. The power tool assembly of claim 1, wherein the combined shield forms a Faraday shield configured to protect the electrical load, the control electronics circuit and the battery pack from a coronal discharge from an adjacent high voltage power line carrying an alternating current (AC) voltage in a transmission range of from about 50,000 volts (V) to about 1,000,000V nominal phase to phase.

9. The power tool assembly of claim 1, wherein the at least one fiber optic cable extends along an interior of the insulative hot stick from the proximal end to the distal end.

10. A power tool assembly adapted for use adjacent a high voltage power line, the power tool assembly comprising:

an insulative hot stick comprising opposing proximal and distal ends;

a power tool supported by the distal end and comprising a housing which encloses at least an electrical load and a control electronics circuit to activate the electrical load responsive to the user interface, the housing comprising a first shield as a continuous layer of conductive material that nominally encloses the electrical load and the control electronics circuit, the first shield open at a battery pack receiving slot of the housing;

a removeable battery pack mateable with the battery pack receiving slot of the housing to supply electrical power for use by the electrical load and the control electronics circuit;

a removable protective boot adapted to surround the removeable battery pack upon engagement with the housing, the boot comprising a second shield as a continuous layer of conductive material that nominally encloses the removeable battery pack and overlaps a first portion of the first shield to form a combined shield that nominally encloses the electrical load, the control electronics circuit and the battery pack; and a user interface supported by the proximal end of the insulative hot stick configured to enable a user to activate the power tool assembly via a non-conductive communication link that extends along an overall length of the insulative hot stick, the communication link establishing communication between a user interface communication circuit of the user interface and the control electronics circuit.

11. The power tool assembly of claim 10, wherein the communication link comprises a fiber optic cable.

12. The power tool assembly of claim 11, wherein the fiber optic cable extends along an interior of the insulative hot stick from the proximal end to the distal end.

13. The power tool assembly of claim 10, wherein the communication link utilizes hydraulic fluid.

14. The power tool assembly of claim 10, wherein the combined shield forms a Faraday shield configured to protect the electrical load, the control electronics circuit and the battery pack from a coronal discharge from an adjacent high voltage power line carrying an alternating current (AC) voltage of at least about 480 volts (V) nominal phase to phase.

15. The power tool assembly of claim 10, wherein the boot further comprises a locking feature that engages a corresponding feature of the housing to mechanically secure the boot to the housing to retain the boot in said engagement with the housing.

16. The power tool assembly of claim 10, wherein the housing further comprises a continuous layer of electrically insulative material affixed to an exterior surface of the layer of conductive material forming the first shield, and the boot further comprises a continuous layer of electrically insulative material affixed to an exterior surface of the layer of conductive material forming the second shield.

17. The power tool assembly of claim 10, wherein the boot has an outer surface on which is printed human readable indicia comprising a warning message to the user of the power tool assembly associated with a high voltage.

18. The power tool assembly of claim 10, further comprising an interlock mechanism that prevents activation of the electrical load by the control electronics circuit responsive to absence of the boot.

19. The power tool assembly of claim 10, wherein the electrical load comprises a motor.

20. The power tool assembly of claim 10, further comprising a suppression circuit disposed between the first and second shields.

* * * * *